(12) United States Patent
Fragoso (10) Patent No.: US 11,217,107 B2
(45) Date of Patent: Jan. 4, 2022

(54) SIMULTANEOUS REPRESENTATION OF MOVING AND STATIC OBSTACLES FOR AUTOMATICALLY CONTROLLED VEHICLES

(71) Applicant: California Institute of Technology, Pasadena, CA (US)

(72) Inventor: Anthony T. S. Fragoso, Los Angeles, CA (US)

(73) Assignee: CALIFORNIA INSTITUTE OF TECHNOLOGY, Pasadena, CA (US)

(*) Notice: Subject to any disclaimer, the term of this patent is extended or adjusted under 35 U.S.C. 154(b) by 0 days.

(21) Appl. No.: 16/150,585

(22) Filed: Oct. 3, 2018

(65) Prior Publication Data

US 2019/0108764 A1 Apr. 11, 2019

Related U.S. Application Data

(60) Provisional application No. 62/568,707, filed on Oct. 5, 2017.

(51) Int. Cl.
*G08G 5/04* (2006.01)
*G05D 1/02* (2020.01)
(Continued)

(52) U.S. Cl.
CPC .......... *G08G 5/045* (2013.01); *B64C 39/024* (2013.01); *G05D 1/0202* (2013.01); *G05D 1/024* (2013.01);
(Continued)

(58) Field of Classification Search
CPC ........ G08G 1/161; G08G 1/163; G08G 1/165; G08G 1/166; G08G 5/045; G08G 5/0069;
(Continued)

(56) References Cited

U.S. PATENT DOCUMENTS

| 8,244,458 B1 * | 8/2012 | Blackburn | G08G 1/166 701/301 |
| 10,665,115 B2 * | 5/2020 | Fragoso | B64C 39/024 |

(Continued)

OTHER PUBLICATIONS

Kunwar, Faraz et al., "Rendezvous-Guidance Trajectory Planning for Robotic Obstacle Avoidance and Interception", IEEE Transactions on Systems, Man, and Cybernetics—Part B: Cybernetics, vol. 36 No. 6, Dec. 2006, pp. 1432 to 1441 (Year: 2006).*

(Continued)

*Primary Examiner* — David A Testardi
(74) *Attorney, Agent, or Firm* — Gates & Cooper LLP (57) ABSTRACT

A method and system provide the ability to automatically control a vehicle to avoid obstacle collision. Range data of a real-world scene (including depth data to static objects) is acquired. Positions and velocities of moving objects are acquired. The range data is combined into an egospace representation for pixels in egospace that is specified with respect to a radially aligned coordinate system. An apparent size of the static objects is expanding, in the egospace representation, based on a dimension of the vehicle. A speed of the vehicle is specified. A velocity obstacle corresponding to the moving objects is constructed. A mask is created in the coordinate system and identifies candidate radial paths that will result in a collision between the vehicle and the moving objects. The mask is combined with the egospace representation that is then used to determine a path for the vehicle.

22 Claims, 7 Drawing Sheets

(51) Int. Cl.

| | |
|---|---|
| *G05D 1/12* | (2006.01) |
| *G08G 5/00* | (2006.01) |
| *G06T 7/70* | (2017.01) |
| *B64C 39/02* | (2006.01) |
| *G06T 7/20* | (2017.01) |

(52) U.S. Cl.
CPC .............. *G05D 1/12* (2013.01); *G06T 7/20* (2013.01); *G06T 7/70* (2017.01); *G08G 5/0021* (2013.01); *G08G 5/0069* (2013.01); *G08G 5/0078* (2013.01); *B64C 2201/141* (2013.01); *G06T 2207/30261* (2013.01)

(58) Field of Classification Search
CPC .. G05D 1/0088; G05D 1/0212; G05D 1/0214; G05D 1/0289; G05D 1/0202; B60W 30/09; B60W 30/095; B60W 30/0956; B64C 39/024; B64C 2201/141; G06T 7/70

See application file for complete search history.

(56) References Cited

U.S. PATENT DOCUMENTS

| | | | | |
|---|---|---|---|---|
| 2005/0216181 | A1* | 9/2005 | Estkowski | G08G 1/164 701/411 |
| 2007/0080825 | A1* | 4/2007 | Shiller | G08G 1/166 340/903 |
| 2011/0160950 | A1* | 6/2011 | Naderhirn | G05D 1/0202 701/28 |
| 2011/0304633 | A1* | 12/2011 | Beardsley | G06T 13/80 345/474 |
| 2012/0265380 | A1* | 10/2012 | Kuwata | G05D 1/0206 701/21 |
| 2013/0235047 | A1* | 9/2013 | Xia | G06T 13/80 345/474 |
| 2015/0301529 | A1* | 10/2015 | Pillai | H04L 67/12 701/2 |
| 2016/0070265 | A1 | 3/2016 | Liu et al. | |
| 2016/0260328 | A1* | 9/2016 | Mishra | G05D 1/0088 |
| 2016/0299507 | A1* | 10/2016 | Shah | G05D 1/0206 |
| 2017/0193830 | A1* | 7/2017 | Fragoso | B64C 39/024 |
| 2017/0253330 | A1 | 9/2017 | Saigh et al. | |
| 2017/0255802 | A1* | 9/2017 | Falk | B64C 39/024 |
| 2018/0120847 | A1 | 5/2018 | Chen | |
| 2018/0354511 | A1* | 12/2018 | Meyer | B60T 8/17558 |
| 2019/0094866 | A1* | 3/2019 | Moore | B60W 30/08 |
| 2019/0361452 | A1* | 11/2019 | Tahir | G01S 13/589 |

OTHER PUBLICATIONS

Gong, Jianwei et al., "VPH+: An enhanced vector polar histogram method for mobile robot obstacle avoidance", Proceedings of the 2007 IEEE International Conference on Mechatronics and Automation, Aug. 5-8, 2007, Harbin, China, pp. 2784 to 2788 (Year: 2007).*

Kapadia, Mubbasir et al., "Parallelized egocentric fields for autonomous navigation", The Visual Computer (2012), 28:1209-1227, pp. 1209 to 122 (Year: 2012).*

Snape, Jamie et al., "Goal Velocity Obstacles for Spatial Navigation of Multiple Autonomous Robots or Virtual Agents", Autonomous Robots and Multirobot Systems, St. Paul, Minn., 2013, 17 pages (Year: 2013).*

Lee, Seung-Hwan et al., "Robust Robot Navigation Using Polar Coordinates in Dynamic Environments", Journal of Industrial and Intelligent Information, vol. 2 No. 1, Mar. 2014, pp. 6 to 10 (Year: 2014).*

Fragoso, Anthony et al., "Dynamically Feasible Motion Planning for Micro Air Vehicles using an Egocylinder", Conference Paper as published at ResearchGate, Sep. 2017, 15 pages (Year: 2017).*

"RIS Format Specifications", 9 pages, downloaded on Jan. 31, 2020 from: https://jira.sakaiproject.org/secure/attachment/21845/RIS+Format+Specifications.pdf (Year: 2020).*

Van den Berg, Jur et al., "Reciprocal n-Body Collision Avoidance", Robotics Research, STAR 70, pp. 3-19, (c) Springer-Verlag Berlin Heidelberg 2011. (Year: 2011).*

Gal, Oren et al., "Fast and efficient visible trajectories planning for the Dubins UAV model in 3D built-up environments", Robotica (2014), vol. 32, pp. 143-163 (Year: 2014).*

Wikipedia article, "Dubins path", Old revision dated Aug. 3, 2017, 3 pages (Year: 2017).*

Szadeczky-Kardoss, Emese Gincsaine et al., "Velocity obstacles for Dubins-like mobile robots", 2017 25th Mediterranean Conference on Control and Automation (MED), Jul. 3-6, 2017, Valletta, Malta, © 2017 IEEE, pp. 346 to 351 (Year: 2017).*

Schroder, Peter et al., "Spherical wavelets: texture processing", from Rendering Techniques '95, EGSR 1995, Eurographics. Springer, Vienna, 13 pages, https://doi.org/10.1007/978-3-7091-9430-0_24 (Year: 1995).*

StackExchange, "Why do we denote S1 for the unit circle and S2 for unit sphere?", 2014, 3 pages, from: https://math.stackexchange.com/questions/855469/why-do-we-denote-s1-for-the-the-unit-circle-and-s2-for-unit-sphere (Year: 2014).*

Christian, Austin, "Math 123 discussion section", Week 8 Notes, May 23, 2017, UCLA Mathematics, 3 pages, downloaded from: https://www.math.ucla.edu/~archristian/teaching/123-s17/week-8.pdf (Year: 2017).*

Wikipedia article, "n-sphere", Old revision dated Sep. 30, 2017, 12 pages. (Year: 2017).*

Fragoso, Anthony T., "Egospace motion planning representations for micro air vehicles", CalTech Dissertation, (c) 2018, 112 pages (Year: 2018).*

Gal, Oren et al., "Motion Planning in 3D Environments Using Visibility Velocity Obstacles", GEOProcessing 2018: The Tenth International Conference on Advanced Geographic Information Systems, Applications, and Services, 2018, pp. 60 to 65 (Year: 2018).*

Ishida, T., et al., "Moving Target Search", International Conference on Artificial Intelligence, 1991, pp. 204-210.

Sun, X., et al., "Moving target D* Lite*", Proceedings of the International Joint Conference on Autonomous Agents and Multiagent Systems (AAMAS), 2010, pp. 67-74.

Van Den Berg, J., et al., "Reciprocal Velocity Obstacles for Real-Time Multi-Agent Navigation", 2008 IEEE International Conference on Robotics and Automation, May 19-23, 2008, pp. 1928-1935.

Liu, S., et al., "Planning Dynamically Feasible Trajectories for Quadrotors using Safe Flight Corridors in 3-D Complex Environments", Robotics and Automation Letters, 2017, pp. 1-8, vol. 2, No. 3.

Dryanovski, I., et al., "Multi-Volume Occupancy Grids: an Efficient Probabilistic 3D Mapping Model for Micro Aerial Vehicles", The 2010 IEEE/RSJ International Conference on Intelligent Robots and Systems, Oct. 18-22, 2010, pp. 1553-1559.

Heng, L., et al., "Autonomous Obstacle Avoidance and Maneuvering on a Vision-Guided MAV Using On-Board Processing", IEEE Intl. Conf, on Robotics and Automation, 2011, pp. 1-6.

Fraundorfer, F., et al., "Vision-Based Autonomous Mapping and Exploration Using a Quadrotor MAV", IEEE Intl. Conf. on Intelligent Robots and Systems, 2012, pp. 1-8.

Bakolas, E., et al., "Multiresolution Path Planning via Sector Decompositions Compatible to On-Board Sensor Data", AIAA Guidance, Navigation, and Control Conf., 2008, pp. 1-11.

Yu, H., et al., "Vision-based Local-level Frame Mapping and Planning in Spherical Coordinates for Miniature Air Vehicles", 2011 50th IEEE Conference on Decision and Control and European Control Conference (CDC-ECC), Dec. 12-15, 2011, pp. 558-563.

Barry, A.J., et al., "Pushbroom Stereo for High-Speed Navigation in Cluttered Environments", IEEE Intl. Conf. on Robotics and Automation, 2014, pp. 1-6.

Fragoso, A., et al., "A fast motion planning representation for configuration flat robots with applications to micro air vehicles", American Control Conf., 2017, pp. 4195-4202.

(56) References Cited

OTHER PUBLICATIONS

Fragoso, A., et al., "Dynamically feasible motion planning for micro air vehicles using an egocylinder", Conf. on Field and Service Robotics, 2017, pp. 433-447.
Brockers, R., et al., "Vision-Based Obstacle Avoidance for Micro Air Vehicles Using an Egocylindrical Depth Map", International Symposium on Experimental Robotics, 2016, pp. 505-514.
Brockers, R., et al., "Stereo vision-based obstacle avoidance for micro air vehicles using an egocylindrical image space representation", Micro- and Nanotechnology Sensors, Systems, and Applications VIII, May 2016, pp. vol. 9836.
Matthies, L., et al., "Stereo vision-based obstacle avoidance for micro air vehicles using disparity space", IEEE Intl. Conf. on Robotics and Automation, 2014, pp.
Isaacs, R.P., "Games of Pursuit", RAND Corporation, 1951, pp. 1-16.
Pontani, M., et al., "Optimal Interception of Evasive Missile Warheads: Numerical Solution of the Differential Game", Journal of Guidance, Control and Dynamics, 2008, pp. vol. 31, No. 4.
Yuan, L., et al., "Homing and Navigation Courses of Automatic Target-Seeking Devices", Journal of Applied Physics, 1948, pp. , vol. 19, No. 12.
Palumbo, N., et al., "Modern Homing Missile Guidance and Techniques", Johns Hopkins APL Technical Digest, 2010, pp. vol. 29, No. 1.
Kant, K., et al., "Toward efficient trajectory planning: the path-velocity decomposition", The International Journal of Robotics Research, 1986. pp. 72-89, vol. 5.
Baldini. F., et al., "Fast Motion Planning for Agile Space Systems with Multiple Obstacles", AIAA/AAS Astrodynamics Specialist Conf., 2016, pp. 1-14.
Liu, S., et al., "High speed navigation for quadrotors with limited onboard sensing", IEEE Intl. Conf. on Robotics and Automation, 2016, pp.
Powers, C., et al., "Quadrotor Kinematics and Dynamics", Handbook of Unmanned Aerial Vehicles, 2014, pp. 307-328.
Fleiss, M., et al., "Flatness and Defect of Nonlinear Systems: Introductory Theory and Examples", Int. J. Control, 1995, pp. 1-43, vol. 61, No. 6.
Weisstein, E., "Circle-Line Intersection." From MathWorld—A Wolfram Web Resource, 2018, http://mathworld.wolfram.com/Circle-LineIntersection.html, as downloaded Oct. 3, 2019.
Weisstein, E., ""Cone-Sphere Intersection." From MathWorld—A Wolfram Web Resource, 2018, http://mathworld.wolfram.com/Cone-SphereIntersection.html", as downloaded Oct. 3, 2019.
Lavalle, S., Planning Algorithms, 1st ed. Cambridge, University Press, 2006.
PCT International Search Report & Written Opinion dated Jan. 25, 2019 for PCT Application No. PCT/US2018/054142.
Lee, S-H., et al., "Robust Robot Navigation using Polar Coordinates in Dynamic Environments", Journal of Industrial and Intelligent Information, Mar. 2014, pp. 6-10, vol. 2, No. 1.
Fiorini, P., et al., "Motion Planning in Dynamic Environments using Velocity Obstacles", International Journal of Robotics Research, Jan. 1, 1995, pp. 1-40.
Kunwar, F., "Rendezvous-Guidance Trajectory Planning for Robotic Dynamic Obstacle Avoidance and Interception", IEEE Transactions on Systems, Man, and Cybernetics—Part B: Cybernetics, Dec. 2006, pp. 1432-1441, vol. 36, No. 6.
Bis, R., et al., "Velocity Occupancy Space: Robot Navigation and Moving Obstacle Avoidance With Sensor Uncertainty", ASME 2009 Dynamic Systems and Control Conference, vol. 1, Jan. 1, 2009. pp. 363-370, XP055543501.
Nelson, D., et al., "Vector Field Path Following for Miniature Air Vehicles", IEEE Transactions on Robotics, IEEE Service Center, Jun. 2007, pp. 519-529, vol. 23, No. 3.
Alsaab, A., et al., "Improving velocity obstacle approach for obstacle avoidance in indoor environments", 2014 UKACC International Conference on Control (CONTROL), Jul. 9, 2014, pp. 325-330.
Levy, A., et al., "The Extended Velocity Obstacle and applying ORCA in the real world", 2015 IEEE International Conference on Robotics and Automation (ICRA), May 2015, pp. 16-22.
Final Office Action dated Sep. 17, 2019 for U.S. Appl. No. 15/394,647.
Notice of Allowance dated Jan. 15, 2020 for U.S. Appl. No. 15/394,647.

\* cited by examiner

FIG. 6

SIMULTANEOUS REPRESENTATION OF MOVING AND STATIC OBSTACLES FOR AUTOMATICALLY CONTROLLED VEHICLES

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 62/568,707, filed on Oct. 5, 2017, with inventor(s) Anthony T. Fragoso, entitled "Simultaneous Representation of Moving and Static Obstacles for Micro Air Vehicles".

This application is related to the following co-pending and commonly-assigned patent application, which application is incorporated by reference herein:

U.S. patent application Ser. No. 15/394,647, filed on Dec. 29, 2016, which issued May 26, 2020 as U.S. Pat. No. 10,665,115 with inventor(s) Anthony T. S. Fragoso, Larry H. Matthies, Roland, Brockers, and Richard M. Murray, entitled "Controlling Unmanned Aerial Vehicles to Avoid Obstacle Collision", which application claims the benefit of 62/274,924 filed on Jan. 5, 2016 and 62/397,284 filed on Sep. 20, 2016; and U.S. patent application Ser. No. 16/040,006, filed on Jul. 19, 2018, with inventor(s) Larry H. Matthies and Cevahir Cigla, entitled "Gaussian Mixture Models for Temporal Depth Fusion", which application is a continuation-in-part application of U.S. patent application Ser. No. 15/394,647, filed on Dec. 29, 2016, with inventor(s) Anthony T. S. Fragoso, Larry H. Matthies, Roland Brockers, and Richard M. Murray, entitled "Controlling Unmanned Aerial Vehicles to Avoid Obstacle Collision,", which application claims the benefit of 62/274,924 filed on Jan. 5, 2016 and 62/397,284 filed on Sep. 20, 2016;

STATEMENT REGARDING FEDERALLY SPONSORED RESEARCH AND DEVELOPMENT

The invention described herein was made in the performance of work under a NASA contract NNN12AA01C, and is subject to the provisions of Public Law 96-517 (35 USC 202) in which the Contractor has elected to retain title.

BACKGROUND OF THE INVENTION

1. Field of the Invention

The present invention relates generally to automatically controlled vehicles in two or three dimensions, such as aircraft, watercraft, and planar ground vehicles, and in particular, to a method, system, apparatus, and article of manufacture for automatically avoiding static and moving obstacles while operating such vehicles.

2. Description of the Related Art (Note: This application references a number of different publications as indicated throughout the specification by reference numbers enclosed in brackets, e.g., [Name 20xx]. A list of these different publications ordered according to these reference numbers can be found below in the section entitled "References." Each of these publications is incorporated by reference herein.)

Prior Art Overview

With automatically controlled vehicles (e.g., aircraft, watercraft, and planar ground vehicles), it is often desirable to either avoid or target obstacles. Such obstacles may be moving obstacles, static obstacles, or both (e.g., along a trajectory/path of the vehicle). Prior art implementations are unable to avoid/target both moving and static obstacles. To better understand such prior art issues, a description of prior art obstacle avoidance is useful.

Only Moving Obstacles

In the absence of static obstacles or location constraints, multi-agent collision avoidance is typically dealt with using a velocity obstacle formulation [Fiorini 1998], in which the relative velocity, size, and separation of each vehicle pair is used to calculate the set of velocities that will ultimately result in a collision. This procedure is based on the well-known maritime principle of constant bearing, decreasing range (CBDR)—if a vehicle appears to be approaching but lingers at the same relative direction when viewed from the second vehicle, a collision will result unless evasive action is taken. More formally, two vehicles are defined to be on a collision course if the relative velocity vector of the pair, when placed at the first vehicle, is directed at the second vehicle. The formal version of the CBDR principle can be used to systematically calculate a velocity obstacle region [Fiorini 1998] in the space of instantaneous candidate vehicle velocity vectors, consisting of the candidate velocity vectors that eventually will result in a collision if selected and maintained. To avoid collision, the controlled vehicle must select a velocity vector outside of this set. If both vehicles are controlled, this velocity vector may be averaged with the initial velocity to reduce oscillatory behavior [van den Berg 2008].

Only Static Obstacles

Representation and motion planning for static (non-moving) obstacles are themselves an area of active research, particularly for size, weight and power (SWaP) constrained vehicles. Regardless of how static obstacle locations are acquired, the automatic control procedure that eventually determines how the vehicle's actuators (such as motors that drive propellers or control surfaces) must move to avoid collision relies first on an internal representation that stores and indexes the locations of static obstacles in an image. To date, motion planners for complex three dimensional environments (typically focused on micro air vehicles as a research testbed) rely classically on the creation of a 3D "voxel" map in which a 3D world is discretized into a grid and occupancy (the presence or absence of an obstacle) is noted at each point (such as [Liu1 2017], [Dryanovsky 2010], and the "state-lattice" technique of [Heng 2011]). This representation has been successfully used on a quad-copter with stereo vision during a mapping operation, but at low speeds with negligible dynamics and a planar motion constraint [Fraundorfer 2012]. Uniformly discretized voxel-based approaches are simple to index and store, but require a transformation step in which range data is converted into Cartesian coordinates and a 3D grid filled out accordingly.

Attempts to more compactly represent static obstacles often use a conversion to cylindrical or spherical coordinates of some sort ([Bakolas 2008], [Yu 2011]), which have an intrinsic advantage of increased resolution at short ranges where it is most needed, and decreased resolution at long ranges where it is less needed. The idea of scaling stereo vision to high speeds by modulating resolution is taken to its limit by [Barry 2015], which demonstrates a "push broom" technique that only detects obstacles at a single disparity and uses onboard state estimation to propagate their location with no further attempt at detection. This technique is able to achieve extremely high frame rates (120 frames per second), but blind to obstacles that are first encountered at a distance less than that of the detection horizon, cannot handle obstacle motion, and does not offer a significant throughput advantage over hardware-based dense stereo techniques.

More generally and formally, "egospace" representations [Fragoso1 2017] use radially-biased structures (of which cylindrical coordinates are a special case) that index potential paths, in the presence or absence of vehicle dynamics, using a radially-aligned "generalized depth" coordinate and "pixel" coordinates on a subset of the unit sphere $S^2$ (that is, a set of directions). Successful implementations of egospace-based motion planners that included [Fragoso2 2017] and neglected ([Brockers1 2016], [Brockers2 2016]) vehicle dynamics used an "egocylinder" representation structure with inverse range as a generalized depth coordinate along with an azimuth angle and vertical perspective projection as pixels.

The JPL-CLRRT motion planner [Matthies 2014] introduced the concept of "C-space expansion" (characterized for general egospace in [Fragoso1 2017]) directly within the disparity image. The C-space expansion technique expands the apparent size of obstacles directly in disparity image coordinates by a characteristic vehicle radius in order to produce a C-space representation that abstracts the vehicle to a point mass and represents the set of valid (collision-free) vehicle states visible within a scene.

Simultaneous Representation of Moving and Static Obstacles

The representation of an environment for motion planning becomes considerably more challenging if moving and static obstacles occur simultaneously. Cartesian occupancy grids and related methods are typically generalized to accommodate obstacle motion using the explicit consideration of a time coordinate, either as an additional dimension in a space-time data structure (see Chapter 7.1 of [Lavalle 2016]) or through velocity scheduling [Kant 1986], in which a path among the static obstacles is chosen first and its timing modified to avoid the moving obstacles. The addition of a time coordinate severely increases the computational expense and difficulty of motion planning, especially under SWaP constraints and in three dimensions, often to the point of intractability.

Interception of Moving Targets

In the absence of other obstacles, techniques for intercepting a moving target typically rely on reactive "homing" architectures, at least during the closing "endgame" phase, that calculate instantaneous feedback commands. Classical interception techniques are based on proportional navigation laws, in which a "seeker" applies an acceleration proportional to the rotation rate of the line-of-sight vector to the "target" in order to drive it to zero and induce interception [Yuan 1948]. Modern guidance laws [Palumbo 2010] use optimal control theory (often within an LQG (linear-quadratic-Gaussian) framework, from which proportional navigation can be rigorously derived as a special case) and can incorporate target maneuverability and performance constraints.

The theory of zero-sum pursuit-evasion differential games over vehicle dynamics [Isaacs 1951] considers optimal pursuit of an optimally evasive, decision-making maneuverable target using payoff functions and has been theorized as an aerial interception technique against highly maneuverable targets [Pontani 2008].

The interception problem among obstacles bears some resemblance to graph-based planning problems with a changing target goal set ("the hunter problem"). The primary online approaches for the hunter problem are real-time searches ([Ishida 1991] and variants) that interleave execution and calculation of a path but can lead to severe suboptimality, and incremental searches (such as [Sun 2009]) that generate a path to the goal before execution, but reuse prior search results to reduce replanning expense for motion of the goal set and obstacles. Both approaches, however, necessarily restrict motion of both the controllable agent and the target to the nodes of a graph.

Trajectory Selection and Generation

Once an obstacle representation is at hand, it must be searched for a path that is both collision-free and satisfies an internal model of the vehicle dynamics. Although any consistent representation of obstacles can, in theory, serve as an input to an optimal control problem for a safe trajectory, this strategy is usually intractable for real obstacle data and motion planning over dynamics is often performed using a "seed" approach that attempts to modify a dynamics-free motion plan until it satisfies the state equations. A popular approach is "convexification," in which a preliminary candidate path is found using dynamics-free methods and used to build a set of continuous, obstacle-free convex regions within which it is contained. The optimal control problem then proceeds as usual over the restricted convex regions, which simplifies its domain and assists the optimization procedure. These approaches differ primarily in how they seed the optimal control calculation and the assumed structure of the control problem. For spacecraft, SE-SCP [Baldini 2016] uses a novel sampling step to explore C-space and identify spherical obstacle-free regions, over which minimum fuel paths calculated using a sequential convex program. The quadcopter motion planner of ([Liu1 2017], [Liu2 2017]) builds a set of ellipsoids around the result of a graph search over the cells of a Cartesian occupancy grid, which are then grown into convex obstacle-free regions. A minimum-jerk polynomial trajectory is then calculated over the convex regions using a quadratic program on its coefficients.

More efficiently, the motion planner of [Fragoso2 2017] constrains the endpoints, duration, and functional form of a minimum-jerk polynomial so it can be indexed by a "seed" velocity vector that, in turn, is indexed by its magnitude and the pixel coordinates of its direction within egospace. After a scan over the pixels of egospace to identify a pixel that encodes a seed velocity vector that can be safely followed for a sufficiently long duration at a specified speed, the vehicle constructs constrained minimum-jerk polynomials that merge onto the path determined by the seed velocity vector, varying the severity of the turn as needed to avoid collision.

Actuation and Control

Regardless of its origin, the actual execution of a selected trajectory is typically delegated to a low-level controller that can often be split into a fast inner loop that regulates vehicle attitude and thrust and a slower outer loop that regulates vehicle position and speed (as in quadcopter control—[Powers 2015]). This control architecture is well known for autonomous aircraft in particular because it simplifies extraction of input signals to actuators (usually motors of some sort—for example, motors that drive propellers or control surfaces), often also exploiting a "differential flatness" property which allows all vehicle states and controls to be expressed algebraically in terms of a smaller set of "flat outputs" [Fleiss 1995].

Motivation

In view of the above, what is needed is the ability to simultaneously and efficiently represent static and moving obstacles for the identification of trajectories and construction of actuator signals, possibly for the interception of designated target obstacles, that may be used with automatically controlled vehicles for operations in environments that contain static obstacles, moving obstacles, or both.

SUMMARY OF THE INVENTION

One or more embodiments of the invention provide a system, framework, and method for automatically controlling vehicles in environments containing static obstacles, moving obstacles, or both. Static obstacle data from onboard sensors or other externally sensed or broadcast sources are compactly represented, along with moving obstacle data from onboard sensors or other externally sensed or broadcast sources, in a data structure referred to as a combined representation. The combined representation consists of an egospace representation of an obstacle environment that is modified to also incorporate moving obstacles by further excluding regions that result in collision with the moving obstacles. Constraints are applied that allow for the efficient generation of collision-free trajectories that are executed by the vehicle actuators (motors and similar devices) for safe navigation. Embodiments of the invention also enable the interception of moving targets while avoiding other static or moving obstacles.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention provide a pipeline for automatically controlling vehicles in two or three dimensions, such as robotic aircraft (including those of a small, portable size known as micro air vehicles, or MAVs) watercraft, and planar ground vehicles, in environments containing static obstacles, moving obstacles, or both simultaneously. Embodiments may be utilized in/by aircraft of the multirotor family, which include the widely available quadcopter platform (also referred to as a "quadrotor" or, colloquially, as a "drone"). Embodiments may be utilized in/by aircraft of the fixed-wing family, which includes airplane-like platforms. Embodiments may be utilized in/by vehicles with aerodynamic or hydrodynamic control surfaces. Embodiments may be manned or unmanned. Embodiments may seek to intercept, interact with, or intentionally collide with a designated moving or static target (or target region/area). The ability to automatically control such vehicles reliably within environments containing static obstacles, moving obstacles, or both without a pilot is of intense technical interest and has so far been elusive, but is provided by embodiments of the invention.

One or more embodiments of the invention are not restricted to a particular hardware implementation, but typically include an onboard computer that receives raw static obstacle data, derived either from onboard sensors that measure the distance to obstacles near the vehicle (including, but not limited to, cameras and laser-based devices) or sourced from elsewhere (including, but not limited to a broadcast or a preexisting map), and arranges it into a very compact and efficient data structure with indexing that naturally generates a favorable resolution pattern for obstacle sensing (the "egospace representation"). The onboard computer also receives moving obstacle data, derived either from onboard sensors that measure the distance to nearby moving obstacles (including, but not limited to, cameras and laser-based devices) or sourced from elsewhere (including, but not limited to, a broadcast or known predetermined trajectory estimate), comprised of a characteristic size of each obstacle along with its relative or absolute velocity and position. The onboard computer merges the moving obstacle data and the static obstacle data into a "combined representation" in the same egospace coordinate system. The onboard computer calculates a collision-free trajectory from which the appropriate actuator signals (for example, a motor spinning a propeller) are produced and sent to the actuators themselves to cause the aircraft to follow that trajectory.

One or more embodiments of the invention automatically control a vehicle, referred to hereafter as "vehicle A," and in addition to any static obstacles consider the avoidance of one or more moving obstacles, of which any particular instance is referred to hereafter as "vehicle B."

Construction of Restricted Velocity Obstacles

Two Dimensions

Figure 1:
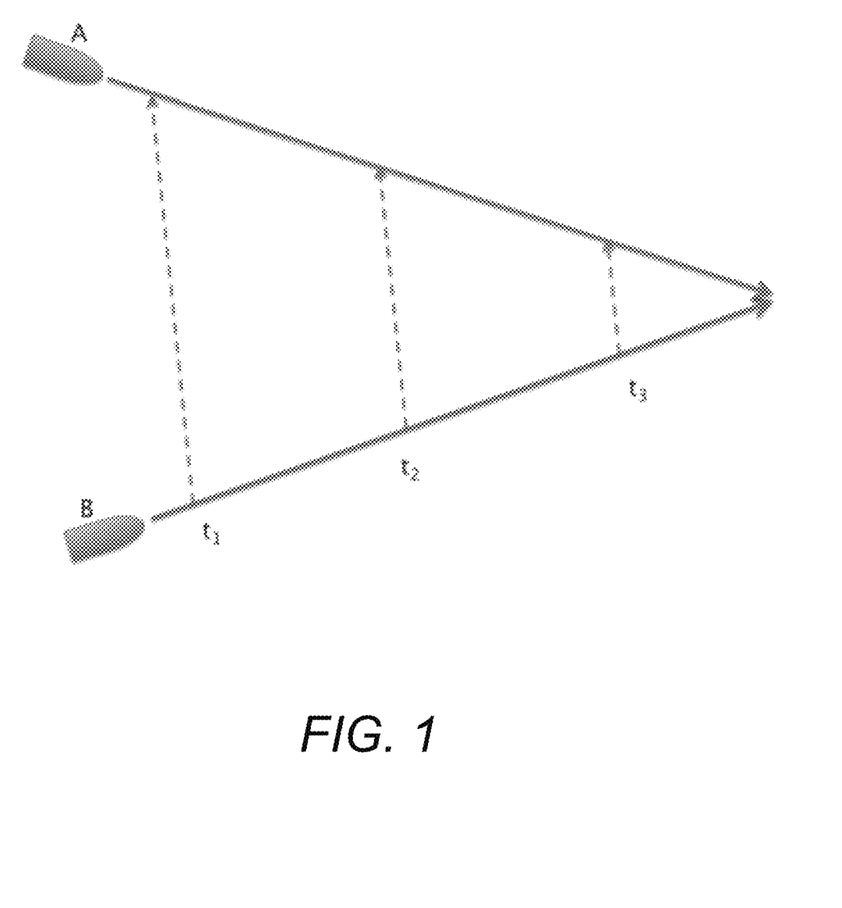
FIG. 1 illustrates the "constant bearing decreasing range" (CBDR) principle that must occur if two vehicles are on a collision course in accordance with one or more embodiments of the invention.

Embodiments of the invention may operate in a two-dimensional engagement between vehicle A and vehicle B in which vehicle B is non-compliant and cannot be expected to yield or otherwise change its course. Vehicle B is determined by measurement or from an external source to have a velocity vector vs and be located at a relative position (the "separation vector") $x_{BA}$ from vehicle A (each vector expressed in the same two-dimensional body-carried and body-centered frame of vehicle A). Vehicle A is abstracted to a point by assuming that vehicle B is circular and possesses a characteristic radius rs that is at least the sum of the radius of the smallest circle that entirely contains vehicle B and the radius of the smallest circle that entirely contains vehicle A. If vehicle A and vehicle B maintain their velocity vectors, a collision will result if the relative velocity vector, when placed at vehicle A, is directed at vehicle B (the principle of "constant bearing decreasing range," FIG. 1). In this regard, FIG. 1 illustrates the "constant bearing decreasing range" (CBDR) principle that must occur if two vehicles are on a collision course in accordance with one or more embodiments of the invention. If vehicle B remains at the same bearing relative to the velocity vector of vehicle A (shown by dotted lines at times $t_1$, $t_2$, $t_3$) and also closes in distance, a collision is inevitable if neither yields.

This constraint identifies the set of relative velocity vectors $v_{AB}=v_A-v_B$ that are inadmissible, which is a cone $C_A$ within the plane. Adding $v_B$ to each vector in $C_A$ gives the velocity obstacle $O_A=C_A+v_B$ for vehicle A, where "+" is understood to be pointwise addition of $v_B$ to each element of $C_A$ [Fiorini 1998]. Any v in $O_A$ will eventually result in a collision between vehicle A and vehicle B if each maintains its course—when $v_B$ is subtracted from v, a relative velocity directed at vehicle B results. Because vehicle B cannot be expected to take evasive action, the motion planning objective for vehicle A is to select any velocity vector that is not in this set (i.e., the velocity obstacle denotes invalid flight directions).

Figure 2:
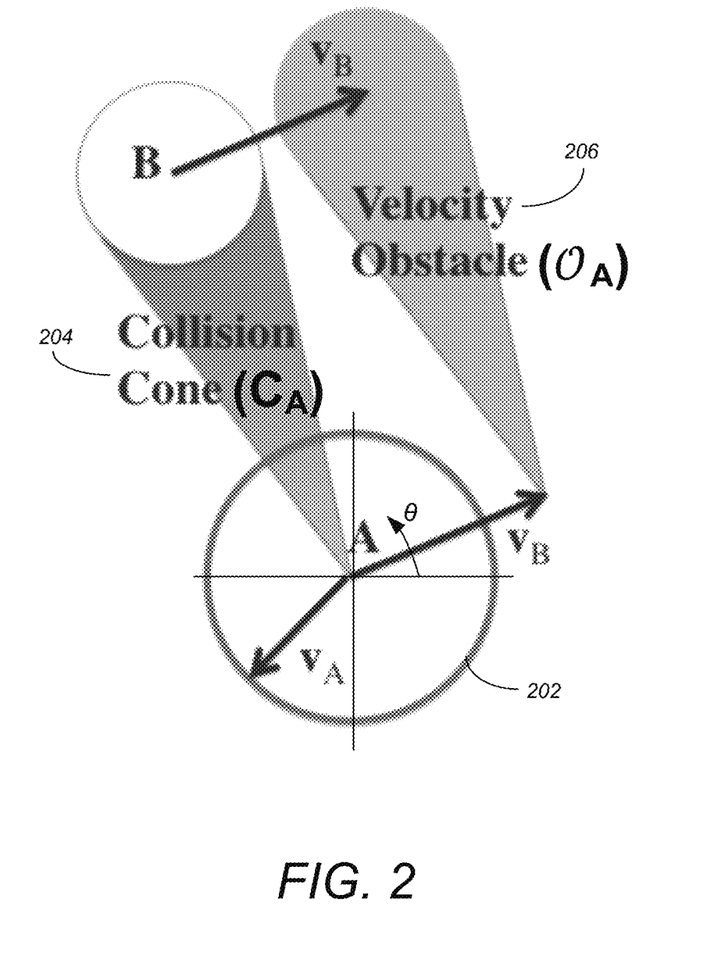
FIG. 2 illustrates the construction of a velocity obstacle for a two dimensional engagement between two vehicles in accordance with one or more embodiments of the invention.

Referring to FIG. 2, one or more embodiments of the invention further restrict the velocity vector candidates of vehicle A to a speed V (possibly equal zero) (i.e., circle 202), based on typical operating velocities, vehicle performance, environmental conditions, and mission objectives, and seeks a collision-free instantaneous direction θ of the unit circle $S^1$ 202. Because V is fixed, the set of forever collision-free θ can calculated by identifying regions of the circle 202 of radius V, centered at the origin, that do not lie within $O_A$, which is itself a two dimensional cone 206 shifted from the origin. Three possible engagement geometries exist under this constraint: first, the circle 202 is contained entirely inside $O_A$ and a collision is inevitable at the speed V; second, the circle 202 is entirely outside $O_A$ and no collision is possible at the speed V; third, the circle 202 intersects with $O_A$, in which case at least one, but no more than two (possibly degenerate) arc segments lie inside the cone 206 and for which the endpoints can be found explicitly using the well-known algebraic solution for intersection of a line with a circle [Weisstein1 2018]. The arc segments that lie within the cone 206 are referred to the "restricted velocity obstacle" at speed V. If an intersection is present, any θ outside of the restricted velocity obstacle corresponds to a collision-free velocity vector with magnitude V, assuming that vehicle B continues upon its current path and there are no other obstacles.

In view of the above, FIG. 2 illustrates the construction of a velocity obstacle 206 for a two dimensional engagement between two vehicles in accordance with one or more embodiments of the invention. Vehicle A is controllable and seeks a velocity vector $v_A$ that will not result in collision, while vehicle B is non-compliant and travels with instantaneous velocity $v_B$. The set of relative velocities $v_{AB}=v_A-v_B$ that are directed at B will eventually result in collisions if no evasive action is taken and lie in the collision cone 204. Adding $v_B$ pointwise to the collision cone gives the set of $v_A$ that will eventually cause a collision with vehicle B if no evasive action is taken, which is known as the velocity obstacle 206. The circle 202 centered on vehicle A is the set of $v_A$ with constant magnitude V, which in this case does not intersect with the velocity obstacle 206 and generates an empty restricted velocity obstacle, which is in general the set of $v_A$ within the velocity obstacle 206 that also have magnitude V.

Three Dimensions

Embodiments of the invention may operate in a three-dimensional engagement between vehicle A and vehicle B in which vehicle B is non-compliant and cannot be expected to yield or otherwise change its course. Vehicle B is determined by measurement or from an external source to have a velocity vector vs and be located at a relative position (the "separation vector") $x_{BA}$ from vehicle A (each vector expressed in the same three-dimensional body-carried and body-centered frame of vehicle A). Vehicle A is abstracted to a point by assuming that vehicle B is spherical and possesses a characteristic radius rs that is at least the sum of the radius of the smallest sphere that entirely contains vehicle B and the radius of the smallest sphere that entirely contains vehicle A. If vehicle A and vehicle B maintain their velocity vectors, a collision will result if the relative velocity vector, when placed at vehicle A, is directed at vehicle B. This constraint identifies the set of relative velocity vectors $v_{AB}=v_A-v_B$ that are inadmissible, which is a cone $C_A$ within three-dimensional space. Adding $v_B$ to each vector in $C_A$ gives the velocity obstacle $O_A=C_A+v_B$ for vehicle A, where "+" is pointwise addition of $v_B$ to each element of $C_A$. Any v in $O_A$ will eventually result in a collision between vehicle A and vehicle B if each maintains its course because when $v_B$ is subtracted, v generates a relative velocity directed at vehicle B. Because vehicle B cannot be expected to take evasive action, the motion planning objective for vehicle A is to select any three-dimensional velocity vector that is not in this set.

One or more embodiments of the invention further restrict the velocity vector candidates of vehicle A to a speed V (possibly equal zero), based on typical operating velocities, vehicle performance, and environmental conditions, and seeks a collision-free instantaneous direction θ of the unit sphere $S^2$. Because V is fixed, the set of forever collision-free θ can calculated by identifying regions of a sphere of radius V, centered about the origin, that do not lie within $O_A$, which is itself a three dimensional cone translated from the origin. Three engagement geometries result: first, the sphere is contained entirely within $O_A$ and a collision is inevitable at the speed V; second, the sphere is entirely outside $O_A$ and no collision is possible at that speed; third, the sphere intersects with $O_A$, in which case at least one, but no more than two (possibly degenerate) simply connected regions $\Omega_1$ and $\Omega_2$ of the sphere lie within $O_A$. The regions of the sphere that lie within the velocity obstacle are referred to as the "restricted velocity obstacle" at speed V. Unlike the two-dimensional case, there is no general straightforward analytic solution for the boundaries of $\Omega_1$ and $\Omega_2$, which involves the simultaneous solution of a quadratic equation in three variables and a quartic equation in two of the three [Weisstein2 2018].

Controllable Obstacles

One or more embodiments of the invention may also consider engagements in which one or more of the moving obstacles are controllable and can be considered together in order to avoid oscillatory behavior and enhance performance. In this regime, the velocity obstacle between vehicle A and a controllable vehicle B can be replaced by a reciprocal velocity obstacle [van den Berg 2008] for each vehicle constructed from the pointwise weighted sum of their respective initial velocities with each vector in the original velocity obstacle. Embodiments otherwise proceed as described above.

Egospace Representation of Restricted Velocity Obstacles

One or more embodiments of the invention use "egospace" as an underlying coordinate system for the expression, processing, and storage of restricted velocity obstacles. Egospace coordinates [Fragoso1 2017] consist of a radially aligned generalized depth coordinate along with a parameterization of $S^2$ ($S^1$ for a two-dimensional planar vehicle) or a region thereof into pixel coordinates. An "egospace representation" assigns one or more generalized depths to each pixel to depict an obstacle environment. An egospace representation is a C-space representation that encodes valid locations for vehicle A if its depictions of obstacles therein have been expanded by at least the radius of the smallest sphere that would contain vehicle A, Embodiments of the invention are not restricted to any particular structure within the class of egospace representations, including those which allow for a 360-degree field of regard.

Embodiments of the invention may use the same egospace coordinates as used to represent static obstacles in an environment for the expression, processing, and storage of moving obstacle data (as described further below).

One or more embodiments of the invention use a discrete set of pixels to store an egospace representation. Embodiments of the invention are not restricted to any specific storage or access implementation, but can use array storage of generalized depth values and identify each element of an array with a specific pixel.

One or more embodiments of the invention may index candidate velocity vectors through identification with an egospace pixel coordinate and a magnitude (equal to the speed V).

Two Dimensions

One or more embodiments of the invention in a two-dimensional engagement use the speed V, a pixel coordinate u, obstacle velocity $v_B$, obstacle radius $r_B$, and vehicle separation vector towards vehicle B $x_{BA}$ to check if the candidate velocity vector given by $v_A(V,u_i)$ results in a collision by determining whether it lies within the interior of the two-dimensional velocity obstacle $O_A$ using its inequality representations:

$$(u \cdot d)^2 - (u \cdot u)\cos^2 \phi \le 0,$$

$$(u \cdot d) > 0,$$

where $d = x_{AB}/\|x_{AB}\|$, $\phi$ is the cone half-aperture set by $\|x_{AB}\|$ and $r_B$, and $u = v_A - v_B$.

Three Dimensions

One or more embodiments of the invention in a three-dimensional engagement use the speed V, candidate pixel coordinates $(u_i, v_i)$, obstacle velocity $v_B$, obstacle radius $r_B$, and vehicle separation vector towards vehicle B, $x_{BA}$, to check if the candidate velocity vector given by $v_A(V, u_i, v_i)$ results in a collision by determining whether it lies within the interior of the three-dimensional velocity obstacle $O_A$ using its inequality representations:

$$(u \cdot d)^2 - (u \cdot u)\cos^2 \phi \le 0,$$

$$(u \cdot d) > 0,$$

where $d = x_{AB}/\|x_{AB}\|$, $\phi$ is the cone half-aperture set by $\|x_{AB}\|$ and $r_B$, and $u = v_A - v_B$. Each point on the sphere is checked against the first inequality with the assistance of a look-up table for the transformation from $(V, \theta, \phi)$ to $(x, y, z)$ and marked "unsafe" if the first inequality holds.

One or more embodiments of the invention check the pixels of an egospace representation and assign to each of the pixels corresponding to $\theta$ within the restricted velocity obstacle a "collision value" that quantifies the imminence of a collision. Although embodiments of the invention are not restricted to any particular scale for imminence of a collision, examples include a generalized depth, such as the generalized depth of the location where the collision would occur between vehicle A and vehicle B if that course were chosen at the speed V, or a Boolean value that encodes whether any collision eventually occurs in that direction (possibly subject to a time-to-contact or distance limit). Each moving obstacle is considered consecutively, and the most imminent collision value at each pixel retained.

One or more embodiments of the invention retain the collision value information at each pixel after processing of the moving obstacles, which is formally a map from the set of pixels to the set of collision values referred to as the "mask".

Merging with Static Obstacles

Figure 3:
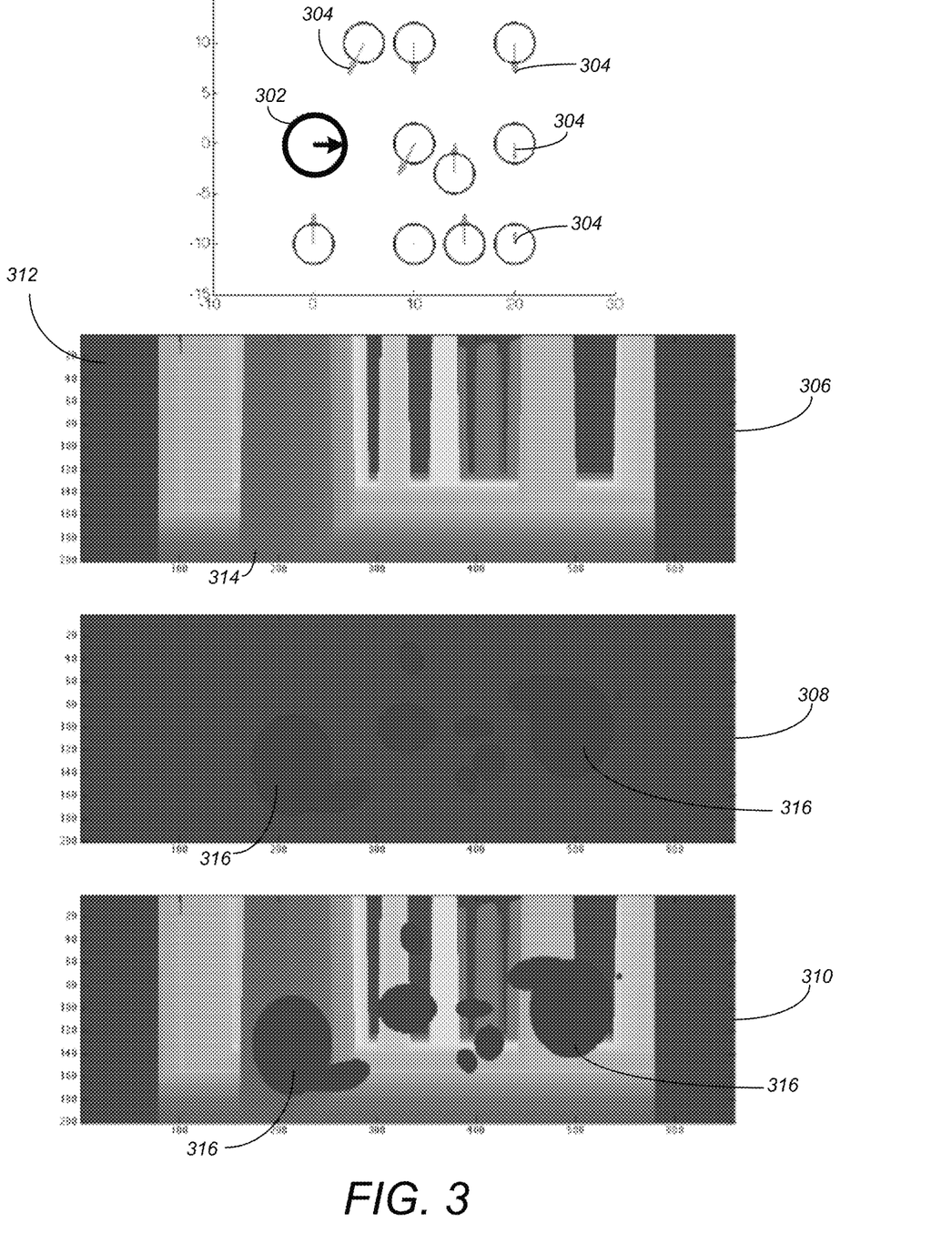
FIG. 3 illustrates the construction of the egospace representation, the mask, and the combined representation for a three-dimensional engagement in accordance with one or more embodiments of the invention.

One or more embodiments of the invention efficiently represent static obstacles using egospace representations that have undergone C-space expansion ([Fragoso1 2017], [Fragoso2 2017], [Brockers1 2016], [Brockers2 2016], [Matthies 2014]). Embodiments of the invention are not restricted to a particular storage or implementation technique, but can merge the mask with the static obstacle egospace representation into a single coherent structure referred to as the "combined representation" by comparing collision values with the generalized depths of the static obstacle egospace representation (FIG. 3). In other words, when a vehicle attempts to maneuver around a moving obstacle with a fixed speed, the set of unsafe 3D flight directions is indexed by coordinates on $S^2$ ($S^1$ in 2D) and can be merged immediately with the angular layout of egospace and its representation of static obstacles. This process is equivalent to generating an artificial static obstacle, with an appropriate generalized depth or collision value, at each pixel that would produce a collision with a moving obstacle if the flight direction it indexes were followed at the specified speed V. Any pixel that satisfies a collision value or generalized depth constraint, towards either a moving or a static obstacle, is referred to as a "seed pixel" and corresponds to a candidate velocity vector referred to as the "seed velocity vector" that can serve as a safe motion plan up to the point of the constraint under an infinite-agility motion model.

In view of the above, FIG. 3 illustrates the construction of the egospace representation, the mask, and the combined representation for a three-dimensional engagement. A controllable vehicle, abstracted to a point mass and seeking a straight-line path at desired speed V (circle 302 is the set of velocity vectors that have the desired speed) attempts to avoid ten expanded obstacles (velocity vectors 304, projected into the plane for visibility [e.g., all velocity vectors other than the set in circle 302]). The engagement occurs within a static forested environment (egocylinder representation 306 shown—area/shading 312 is no depth data, cooler areas/colors/shades 314 are closer). A velocity obstacle mask 308 that indexes directions which result in a collision with a moving obstacle 316 at the speed V is calculated from the restricted velocity obstacle in the same egocylinder coordinates as the static environment and assigned an appropriate depth. Merging the mask 308 into the static obstacle representation 306 results in image 310 (pixels 316 in image 310 are sourced from moving obstacles 316 of image 308) allows for motion planning around the static and moving obstacles within the same representation. Any pixel with a depth greater than that determined by a time-to-contact threshold at the speed V corresponds to a safe motion plan for an infinite agility vehicle up to that threshold.

Seed Velocity Vector Selection

One or more embodiments of the invention ultimately select a seed velocity vector as part of the motion planning pipeline. Embodiments of the invention are not restricted to any particular search implementation, but may do so by scanning over the pixels of the combined representation, retaining safe seed pixels, and reconstructing the corresponding seed velocity vectors.

Embodiments of the invention may constrain or bias a search for a seed velocity vector by considering an intermediate waypoint or preferred direction of travel and attempting to find the seed pixel that will most closely approach the pixel corresponding to an intermediate waypoint or preferred direction of travel. The "closest approach" criterion is not restricted to any particular metric, pseudo-metric, or tie-breaking procedure, but may use Euclidean or "Manhattan" distance in pixel space.

Embodiments of the invention may consider an infinite-agility motion model for vehicle A and send a seed velocity vector directly to a lower-level controller as the trajectory to be followed. The low-level controller then generates actuator input signals that cause the vehicle to track the seed velocity vector.

Embodiments of the invention repeat the seed velocity vector selection process whenever new static or moving obstacle data arrives.

Targeting Scenarios and Intentional Collision

Embodiments of the invention may use a data structure referred to as a "target mask" to identify seed velocity vectors that will cause vehicle A to pursue, intercept, interact with, rendezvous with, or intentionally collide with one of the moving or static obstacles, referred to as the "target obstacle," while avoiding collisions with other moving obstacles and with the static obstacles. The target mask is constructed by selecting the speed V such that a mask considering only the target obstacle includes at least one pixel with a non-trivial collision value (that is, the velocity vector encoded by the pixel coordinates and the speed V will generate a collision with the target obstacle if selected and followed and no other evasive action is taken).

The target mask is used to bias the search for a seed pixel such that an otherwise collision-free pixel with a non-zero collision value in the target mask is chosen as the seed pixel, or if all are excluded by collision with another obstacle, the collision-free pixel closest (in the sense described previously) to any pixel with non-zero collision value in the target mask is chosen as the seed. When the target mask has more than one otherwise collision-free pixel with a non-zero collision value available, the one with the most imminent collision value is preferred.

Vehicle Dynamics

Embodiments of the invention feed the seed velocity vector to a second stage of motion planning that incorporates the dynamics of the vehicle and produces a motion plan that can be followed by an internal dynamical motion model, similar to the two-stage motion planner in [Fragoso2 2017]. After generating an egospace with expanded static and moving obstacles merged into a single representation and selecting a candidate velocity vector, the vehicle calculates a feasible maneuver, referred to as the "initial turn maneuver," that transitions smoothly from the initial vehicle velocity onto a path determined by the seed velocity vector $v_A$ (the "cruise maneuver" discussed below) such that (FIG. 4): first, the final velocity at the end of the initial turn maneuver is directed radially outward from the origin (placed at initial vehicle position) and with the same magnitude and direction as $v_A$ and second, the duration of the initial turn maneuver is equal to that of the infinite-agility "cruise maneuver", generated by following constant $v_A$ with infinite agility from the initial vehicle position, that it meets.

Figure 4:
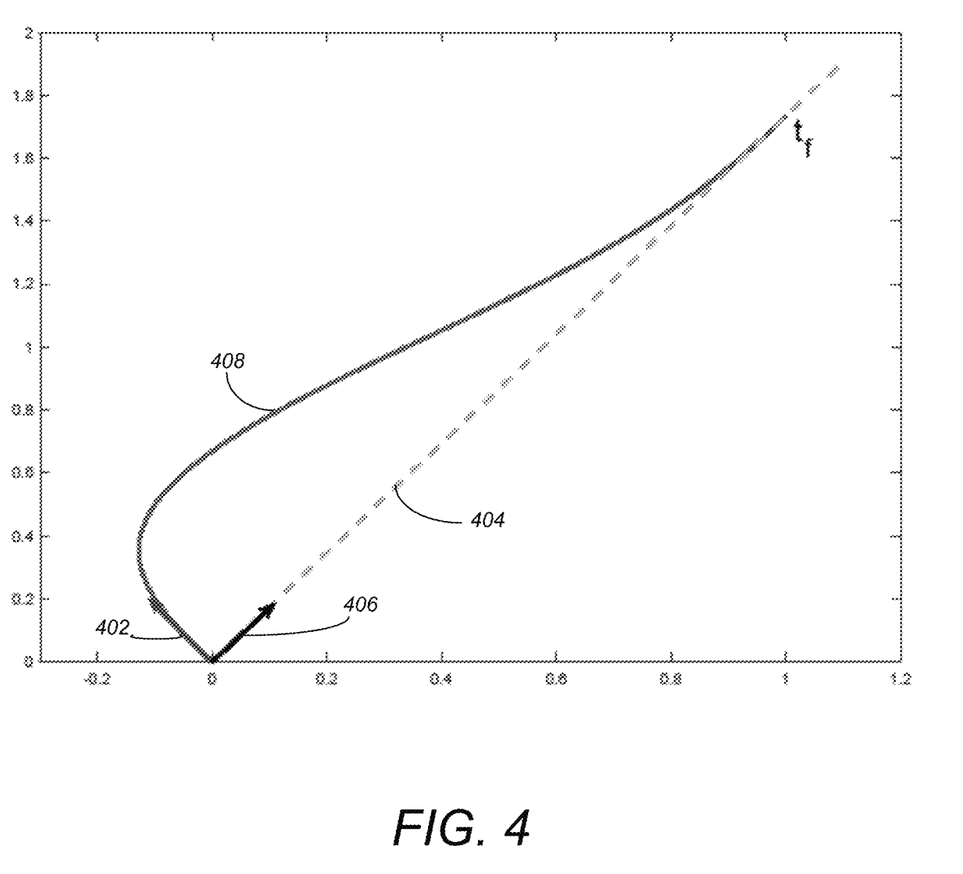
FIG. 4 exemplifies the use of initial turn maneuver constraints to simplify collision-checking in accordance with one or more embodiments of the invention.

In view of the above, FIG. 4 exemplifies the use of initial turn maneuver constraints to simplify collision-checking in accordance with one or more embodiments of the invention. In transitioning from the initial velocity vector 402 (directed left and up) onto the cruise maneuver 404 (dotted) determined by the following a constant seed velocity vector 406 (directed right and up), the initial turn maneuver 408 is constrained to smoothly meet the cruise maneuver 404, in at least velocity and position, at the meeting time $t_f$.

Embodiments of the invention are not restricted to a particular internal dynamical motion model or trajectory generation module for generation of an initial turn maneuver 408 that satisfies the constraints. Embodiments may use differentially flat [Fleiss 1995] motion models and trajectory generation techniques.

Embodiments of the invention collision-check the initial turn maneuver 408 against the combined representation. Collision checking proceeds by first calculating the generalized depth (and, if different, the collision value) of points on the initial turn maneuver 408 at an appropriate resolution. The generalized depths (and, if different, the collision value) of these points are compared to the combined representation, and. if none coincide with obstacles in the combined representation, the initial turn maneuver 408 is determined to be "collision-free" and selected for later execution.

Embodiments of the invention may consider a shorter-duration or internally modified initial turn maneuver, a different seed velocity vector, or a different speed V and again attempt to calculate an initial turn maneuver if a collision is detected.

Embodiments of the invention may append the initial turn maneuver with a trajectory of constant velocity equal to the seed velocity, which is referred to as the "cruise maneuver". By enforcing the endpoint and duration constraints for the initial turn maneuver, the cruise maneuver remains collision-free (as determined by the seed vector selection process described above) against moving and static obstacles up to the generalized depth or collision value of the combined representation and need not be checked again until new obstacle data is acquired.

Embodiments of the invention may employ a "final turn maneuver" that departs from the cruise maneuver, satisfies the internal dynamical motion model, and arrives at a specified destination. The final turn maneuver may be collision-checked in the same fashion as the initial turn maneuver and modified or discarded altogether if found to result in collision.

Embodiments may vary in the smoothness properties of the trajectory across maneuver transition points, but those which satisfy the internal dynamical motion model over the entire trajectory may be preferred.

Execution of the Trajectory

Embodiments of the invention calculate and issue signals for the devices that compel the vehicle to move, referred to as "actuators," and cause it to follow the selected collision-free trajectory consisting of the initial turn maneuver, the cruise maneuver, and the final turn maneuver (if present) executed consecutively. Embodiments are not restricted to any particular class of actuators, but may include motors for spinning propellers/rotors, engines, and moveable control surfaces (such as elevators, rudders, and ailerons). Embodiments of the invention may employ a "configuration flat"

internal dynamical motion model that allows actuator inputs to be determined algebraically from the explicit, implicit, or parametric equations for the trajectory in the space of obstacles, but are not required to do so. Embodiments may calculate actuator signals along with the trajectory during the trajectory generation and collision step described above, but are not required to do so.

Exemplary Hardware Environment

Figure 5A:
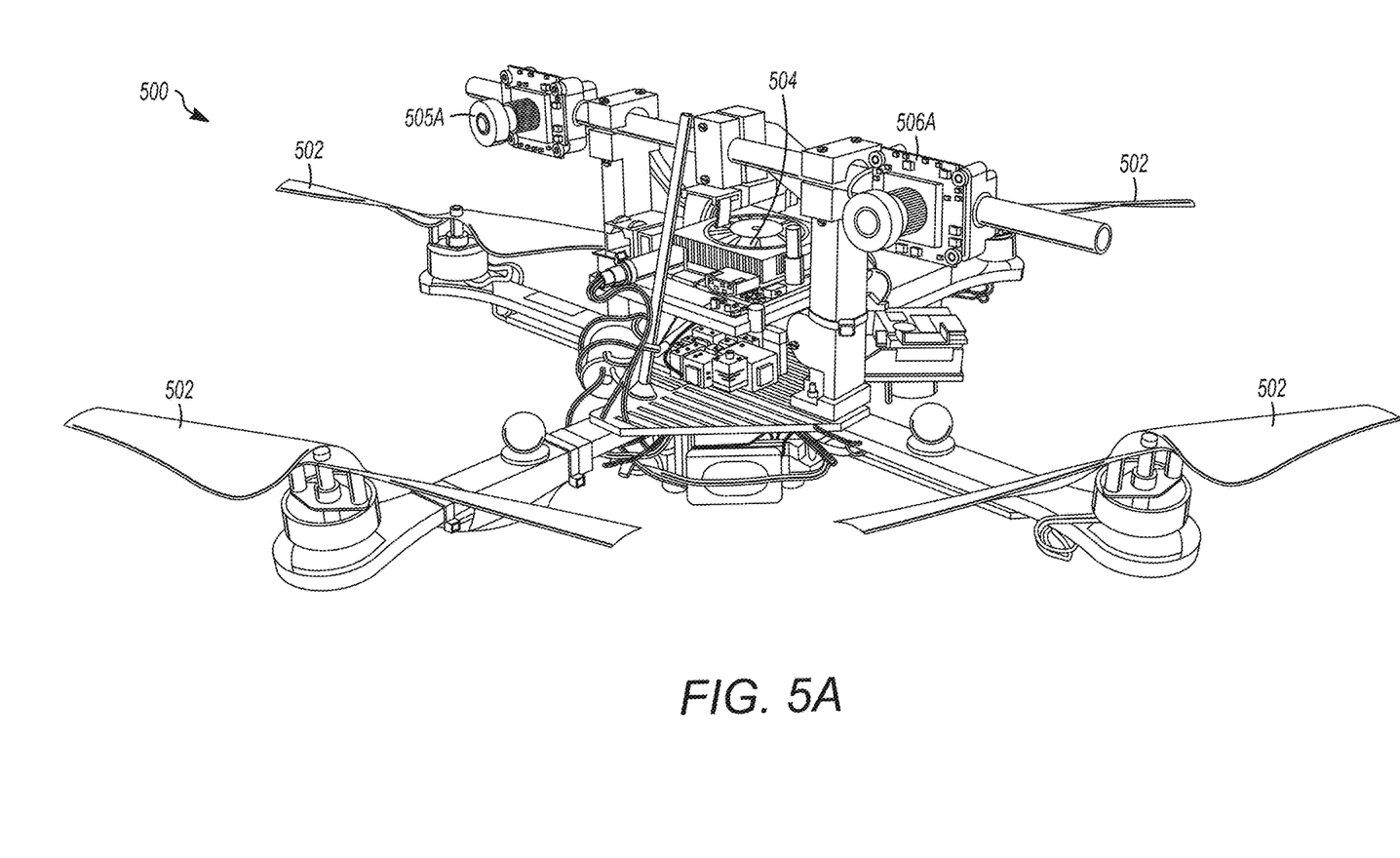
FIGS. 5A and 5B illustrate exemplary vehicles that may be used in accordance with one or more embodiments of the invention.
Figure 5B:
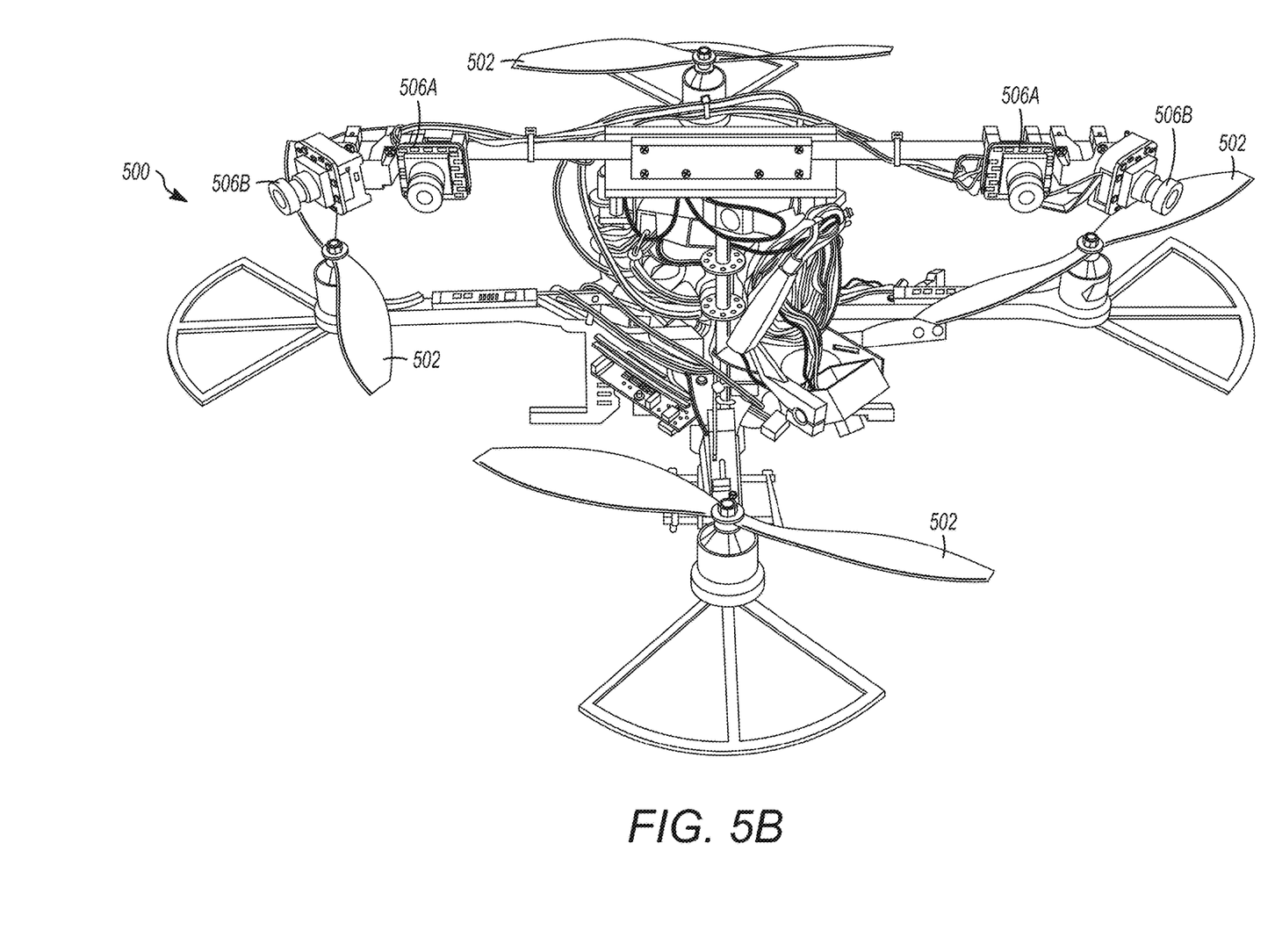

FIGS. 5A and 5B illustrate exemplary vehicles that may be used in accordance with one or more embodiments of the invention. While specific examples are illustrated in FIGS. 5A and 5B, embodiments of the invention are not limited to a particular vehicle (e.g., a micro-air vehicle [MAV]) or configuration. FIG. 5A illustrates a quadcopter MAV 500 (e.g., an ASTEC HUMMINGBRID) that is equipped with four (4) rotors 502, a flight computer 504 (e.g., ODROID XU4), that hosts a cell phone based system on a chip (SoC) (e.g., an 8 core EXYNOS5422 system). Vehicle 500 may include various actuators or controls. In the exemplary MAVs of FIGS. 5A and 5B, such actuators drive the rotors 502. A stereo camera setup uses two cameras 506A (e.g., MATRIX VISION BLUEFOX-MLC200wG cameras [752× 480, gray scale]) that are hardware synchronized. Software on MAV 500 may be running on-board the flight computer 504 using a module (e.g., ROS) for message passing.

Similar to FIG. 5A, FIG. 5B illustrates a quadcopter MAV 500 (e.g., an ASCTEC PELICAN) that is equipped with four camera head (i.e., forward facing cameras 506A and sidelooking cameras 506B. Thus, in addition to the two cameras 506A, embodiments may extend the total field of regard to about 580° by adding side-looking cameras 506B with structure from motion (SfM) for depth perception. Alternatively, laser scanners or any device capable of receiving point cloud information may be utilized for cameras 506. The depth data from all cameras 506 may be projected onto a cylindrical inverse range image referred to herein as an "egocylinder", and C-space expansion may be performed on the egocylinder (as described above and in the related applications).

While MAVs are illustrated in FIGS. 5A and 5B, embodiments of the invention are not limited to such vehicles. As described above, embodiments of the invention may include watercraft, and planar ground vehicles, in environments containing static obstacles, moving obstacles, or both simultaneously. Embodiments may be utilized in/by aircraft of the multirotor family, which include the widely available quadcopter platform (also referred to as a "quadrotor" or, colloquially, as a "drone"). Embodiments may be utilized in/by aircraft of the fixed-wing family, which includes airplanelike platforms. Embodiments may be utilized in/by vehicles with aerodynamic or hydrodynamic control surfaces. Examples of such embodiments may include guided selfpropelled systems (e.g., missiles) that may be propelled via rotors, propellers, rocket/jet propulsion, etc. and or any other type of vehicle that uses any type of engine to control its trajectory. Embodiments may be manned or unmanned. Embodiments may seek to intercept, interact with, or intentionally collide with a designated moving or static target (or target region/area). The ability to automatically control such vehicles reliably within environments containing static obstacles, moving obstacles, or both without a pilot is of intense technical interest and has so far been elusive, but is provided by embodiments of the invention.

Logical Flow

Figure 6:
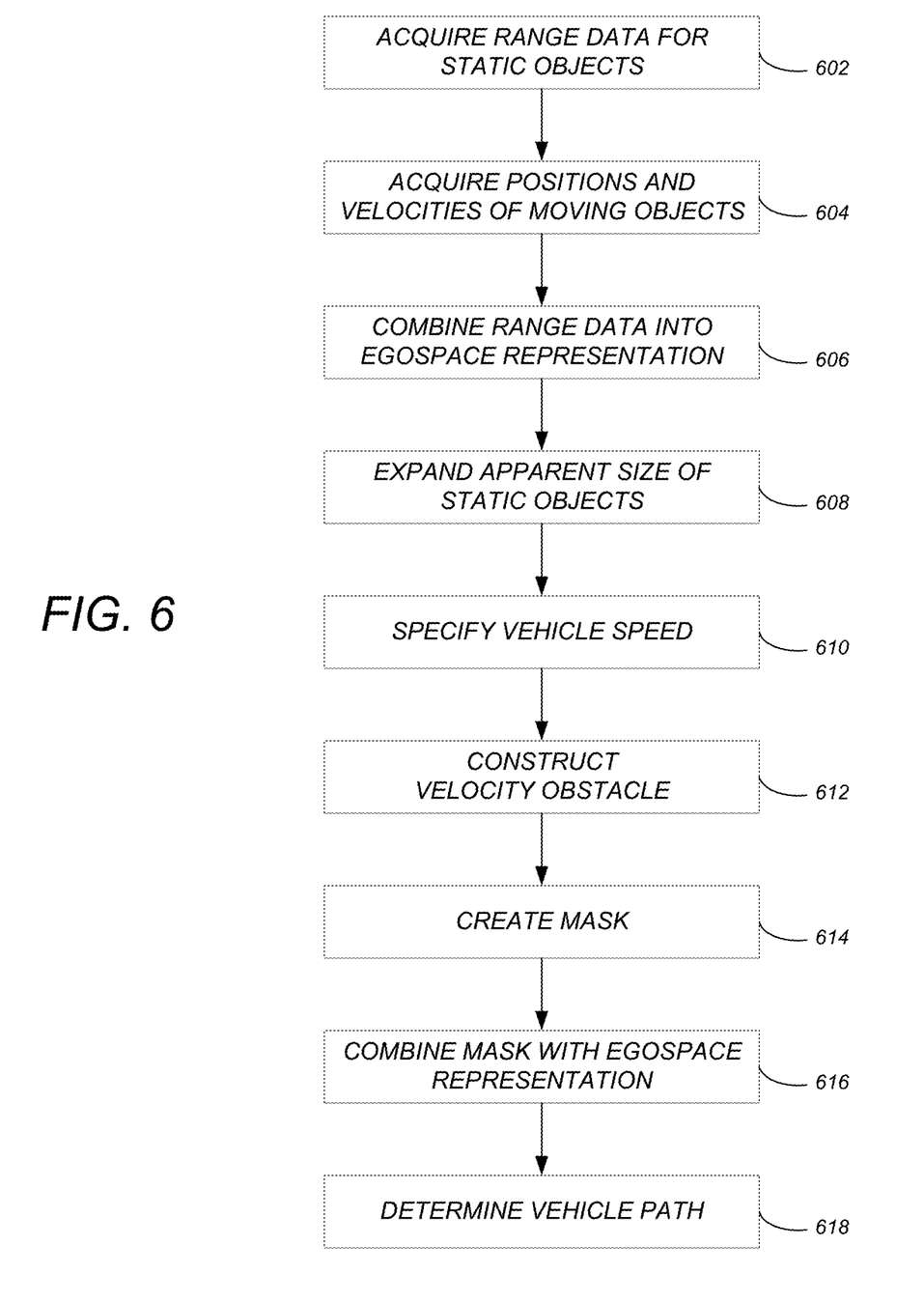
FIG. 6 illustrates the logical flow for automatically controlling a vehicle to avoid obstacle collision in accordance with one or more embodiments of the invention.

FIG. 6 illustrates the logical flow for automatically controlling a vehicle to avoid obstacle collision in accordance with one or more embodiments of the invention.

At step 602, range data of a real-world scene is acquired. The range data is depth data to one or more static objects. The range data may be acquired using one or more range sensors, via broadcast, or via mapped data.

At step 604, positions and velocities of one or more moving objects are acquired. The positions and velocities may be acquired via receipt of a broadcast of such positions and velocities.

At step 606, the range data is combined into an egospace representation. The ego space representation consists of one or more pixels in egospace. Egospace is specified with respect to a coordinate system that is radially aligned.

At step 608, an apparent size of each of the one or more static objects is expanded, in the egospace representation, based on a dimension of the vehicle.

At step 610, a speed (V) of the vehicle is specified.

At step 612, a velocity obstacle corresponding to each of the one or more moving objects is constructed. In this regard, velocity obstacles may be generated for each of the moving objects and consolidated in the mask.

At step 614, a mask is created in the coordinate system (i.e., the same coordinate system as the egospace representation). The mask identifies candidate radial paths that will result in a collision between the vehicle and the one or more moving objects. Such a mask creation may include encoding candidate velocity vectors into each of the one or more pixels, and recording a collision value in the mask for each candidate velocity vector that lies in any of the velocity obstacles. A depth may be calculated and recorded as the collision value. Such a depth corresponds to a location, within the coordinate system, of the collision of the vehicle with the one or more moving objects. Alternatively, the collision value may consist of a Boolean value that encodes a collision potential in a direction.

At step 616, the mask is combined with the egospace representation in the coordinate system, resulting in a combined representation. The mask may be combined by comparing the egospace representation to the mask, and based on the comparing, using a closest collision as the collision in the combined representation.

At step 618, the combined representation is used to determine a path for the vehicle. Such a path determination may include selecting a destination for the vehicle, transforming the destination into coordinates of the combined representation, and generating a trackable path from the vehicle to the transformed destination through the combined representation that avoids collision with the one or more static objects and the one or more moving objects. To avoid collision, a collision free velocity vector may be selected from the combined representation. In such embodiments, the trackable path may include a turn maneuver, a final velocity at an end of the turn maneuver is directed radially outward from a position of the vehicle, and equal to the collision free velocity vector, and a first duration of the turn maneuver is equal to a second duration of following the collision free velocity vector to a point of intersection with the turn maneuver.

Alternatively, the path determination may include designating a target obstacle to be pursued by the vehicle, creating a target mask in the coordinate system (where the target mask identifies a target region that will result in an interaction between the vehicle and the target obstacle), and generating a trackable path from the vehicle to the target region through the combined representation while avoiding a collision with the one or more static objects and the one or more moving objects. In this regard, embodiments of the invention provide the ability to avoid collision with static and/or moving obstacles while targeting a particular obstacle. Embodiments of the invention may be configured to cause the vehicle to interact with the target obstacle (e.g., via a direct collision or to target a region/area within a threshold range of the vehicle).

Further to the above, step 618 may include utilizing one or more actuator inputs to actually control the vehicle to follow the collision free path (i.e., embodiments of the invention include the firing or utilization of actuators to control a vehicle).

CONCLUSION

This concludes the description of the preferred embodiment of the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[Ishida 1991] T. Ishida and R. Korf, "Moving Target Search," *International Conference on Artificial Intelligence*, 1991.

[Sun 2009] X. Sun, W. Yeoh, and S. Koenig, "Moving Target D*-Lite", *International Conference on Autonomous Agents and Multiagent Systems*, 2010.

[Fiorini 1998] P. Firoini and Z. Shiller, "Motion planning in dynamic environments using velocity obstacles," *Intl. Journal of Robotics Research*, vol. 17, no. 7, 1998.

[van den Berg 2008] J. van den Berg, Ming Lin and D. Manocha, "Reciprocal Velocity Obstacles for real-time multi-agent navigation," *IEEE International Conference on Robotics and Automation*, 2008.

[Liu 2017] S. Liu, M. Watterson, K. Mohta, K. Sun, S. Battacharya, C. Taylor, and V. Kumar, "Planning dynamically feasible trajectories for quadrotors using safe flight corridors in 3D complex environments," *Robotics and Automation Letters*, vol. 2, no. 3, 2017.

[Dryanovski 2010] W. Dryanovski, W. Morris, and J. Xiao, "Multi-volume occupancy grids: an efficient probabilistic 3D mapping model for micro aerial vehicles," in *IEEE Intl. Conf. on Intelligent Robots and Systems*, 2010.

[Heng 2011] L. Heng, L. Meier, P. Tanskanen, F. Fraundorfer, and M. Pollefeys, "Autonomous obstacle avoidance and maneuvering on a vision-guided MAV using onboard processing," in *IEEE Intl. Conf. on Robotics and Automation*, 2011.

[Fraundorfer 2012] F. Fraundorfer, L. Heng, D. Honegger, and M. Pollefeys, "Vision-based autonomous mapping and exploration using a quadrotor MAV," in *IEEE Intl. Conf. on Intelligent Robots and Systems*, 2012.

[Bakolas 2008] E. Bakolas and P. Tsiotras, "Multiresolution path planning via sector decompositions compatible to onboard sensor data," in *AIAA Guidance, Navigation, and Control Conf.*, 2008.

[Yu 2011] H. Yu and R. Beard, "Vision-based local-level frame mapping and planning in spherical coordinates for miniature air vehicles," in *IEEE Conf. on Decision and Control*, 2011.

[Barry 2015] A. Barry and R. Tedrake, "Pushbroom stereo for high-speed navigation in cluttered environments," in *IEEE Intl. Conf. on Robotics and Automation*, 2015.

[Fragoso1 2017] A. Fragoso, L. Matthies, and R. Murray, "A fast motion planning representation for configuration flat robots with applications to micro air vehicles, in *American Control Conf.*, 2017.

[Fragoso2 2017] A. Fragoso, C. Cigla, R. Brockers, and L. Matthies, "Dynamically feasible motion planning for micro air vehicles using an egocylinder," in *Conf. on Field and Service Robotics*, 2017.

[Brockers1 2016] R. Brockers, A. Fragoso, B. Rothrock, C. Lee, and L. Matthies, "Vision-based obstacle avoidance for micro air vehicles using an egocylindrical depth map," in *Int. Symp. on Experimental Robotics*, 2016.

[Brockers2 2016] R. Brockers, A. Fragoso, and L. Matthies, "Stereo vision-based obstacle avoidance for micro air vehicles using an egocylindrical image space representation," in *Micro- and Nanotechnology Sensors, Systems, and Applications VIII*, 2016.

[Matthies 2014] L. Matthies, R. Brockers, Y. Kuwata, and S. Weiss, "Stereo vision-based obstacle avoidance for micro air vehicles using disparity space," in *IEEE Intl. Conf. on Robotics and Automation*, 2014.

[Lavalle 2006] S. Lavalle, *Planning Algorithms*, 1st ed. Cambridge University Press, 2006.

[Isaacs 1951] R. Isaacs, *Games of Pursuit*, RAND Corporation, 1951.

[Pontani 2008] M. Pontani and B. Conway, "Optimal Interception of Evasive Missile Warheads: Numerical Solution of the Differential Game," *Journal of Guidance, Control and Dynamics*, vol. 31, no. 4, 2008.

[Yuan 1948] L. Yuan, "Homing and Navigation Courses of Automatic Target-Seeking Devices," *Journal of Applied Physics*, vol. 19, no. 12, 1948.

[Palumbo 2010] N. Palumbo, R. Blauwkamp, and J. Lloyd, "Modern Homing Missile Guidance and Techniques," *Johns Hopkins APL Technical Digest*, vol 29. no. 1, 2010.

[Kant 1986] K. Kant and S. Zucker, "Toward efficient trajectory planning: the path-velocity decomposition," *Intl. Journal of Robotics Research*, vol. 5, no. 3, 1986.

[Baldini 2016] F. Baldini, S. Bandyopadhyay, R. Foust, S. Chung, A. Rahmani, J. de la Croix, A. Bacula, C. Chilan, and F. Hadaegh, "Fast motion planning for agile space systems with multiple obstacles," in *AIAA/AAS Astrodynamics Specialist Conf.*, 2016.

[Liu2 2017] S. Liu, M. Watterson, S. Tang, and V. Kumar, "High speed navigation for quadrotors with limited onboard sensing," in *IEEE Intl. Conf. on Robotics and Automation*, 2016.

[Powers 2015] C. Powers, D. Mellinger, and V. Kumar, "Quadrotor kinematics and dynamics," in *Handbook of Unmanned Aerial Vehicles*, Springer Netherlands, 2015.

[Fleiss 1995] M. Fleiss, J. Levine, P. Martin, and P. Rouchon, "Flatness and defect of nonlinear systems: introductory theory and examples," *Int. J. Control*, vol. 61, no. 6, 1995.

[Weisstein1 2018] E. Weisstein. (2018). "Wolfram mathworld: Circle-Line intersection," [On-line]. Available: mathworld.wolfram.com/Circle-LineIntersection.html

[Weisstein2 2018] E. Weisstein. (2018). "Wolfram mathworld: Cone-Sphere intersection," [On-line]. Available: mathworld.wolfram.com/Cone-SphereIntersection.html

What is claimed is:

1. A method for automatically controlling a vehicle to avoid obstacle collision, comprising:
   (a) acquiring range data of a scene, wherein the range data comprises depth data to one or more static objects in three dimensions;

(b) acquiring positions and velocities of one or more moving objects;
(c) combining the range data into an egospace representation comprising one or more pixels in egospace, wherein egospace is specified with respect to a three-dimensional (3D) coordinate system, wherein the 3D coordinate system contains a radially aligned coordinate, wherein the egospace representation includes a representation of the one or more static obstacles;
(d) specifying a speed (V) of the vehicle;
(e) constructing one or more velocity obstacles corresponding to each of the one or more moving objects, wherein each of the one or more velocity obstacles denote a set of unsafe 3D flight directions for the vehicle, and the constructing comprises checking each point on a sphere, wherein the checking determines whether each point is marked as unsafe, and wherein the set of unsafe 3D flight directions is indexed by coordinates on $S^2$;
(f) creating a mask in the 3D coordinate system, wherein the mask identifies candidate 3D radial paths that will result in a collision between the vehicle and the one or more moving objects based on each of the one or more velocity obstacles;
(g) combining the mask with the egospace representation in the 3D coordinate system, resulting in a combined representation that restricts a set of actions of the vehicle; and
(h) motion planning using the combined representation, wherein the motion planning determines a path including a 3D velocity vector for the vehicle, wherein the combined representation avoids the identified candidate 3D radial paths that will result in the collision based on each of the one or more velocity obstacles, and wherein the motion planning provides a solution for a 3D engagement at the speed (V) of the vehicle; and
(i) maneuvering the vehicle based on the motion planning.

2. The method of claim 1, wherein the range data is acquired using one or more range sensors.

3. The method of claim 1, wherein the acquiring the positions and velocities of the one or more moving objects comprises:
receiving a broadcast of the positions and velocities.

4. The method of claim 1, wherein the creating the mask comprises:
encoding candidate 3D velocity vectors into each of the one or more pixels;
recording a collision value in the mask for each candidate 3D velocity vector that lies in any of the velocity obstacles.

5. The method of claim 4, wherein the recording the collision value comprises:
calculating and recording a depth, as the collision value, wherein the depth corresponds to a location, within the coordinate system, of the collision of the vehicle with the one or more moving objects.

6. The method of claim 4, wherein the collision value comprises:
a Boolean value that encodes a collision potential in a direction.

7. The method of claim 1, wherein the combining the mask comprises:
comparing the egospace representation to the mask; and
based on the comparing, using a closest collision as a collision in the combined representation.

8. The method of claim 1, wherein the using the combined representation to determine a path comprises:
selecting a destination for the vehicle;
transforming the destination into coordinates of the combined representation;
generating a trackable path from the vehicle to the transformed destination through the combined representation that avoids collision with the one or more static objects and the one or more moving objects.

9. The method of claim 8, further comprising:
selecting a collision free 3D velocity vector from the combined representation;
wherein:
the trackable path has a turn maneuver;
a final velocity at an end of the turn maneuver is directed radially outward from a position of the vehicle, and equal to the collision free 3D velocity vector; and
a duration of the turn maneuver is equal to a second duration of following the collision free 3D velocity vector to a point of intersection with the turn maneuver.

10. The method of claim 1, wherein the using the combined representation to determine the path comprises:
designating a target obstacle to be pursued by the vehicle;
creating a target mask in the coordinate system, wherein the target mask identifies a target region that will result in an interaction between the vehicle and the target obstacle; and
generating a trackable path from the vehicle to the target region through the combined representation while avoiding a collision with the one or more static objects and the one or more moving objects.

11. The method of claim 1, further comprising:
utilizing one or more actuator inputs to control the vehicle to follow the path.

12. A control system for automatically controlling a vehicle to avoid obstacle collision comprising:
(a) one or more vehicle controller actuators that maneuver the vehicle in three dimensions; and
(b) a navigation system integrated into the vehicle, wherein the navigation system controls the one or more actuators, and wherein the navigation system:
(a) acquires range data of a scene, wherein the range data comprises depth data to one or more static objects in three dimensions;
(b) acquires positions and velocities of one or more moving objects;
(c) combines the range data into an egospace representation comprising one or more pixels in egospace, wherein egospace is specified with respect to a three-dimensional (3D) coordinate system, wherein the 3D coordinate system contains a radially aligned coordinate, wherein the egospace representation includes a representation of the one or more static obstacles;
(d) specifies a speed (V) of the vehicle;
(e) constructs one or more velocity obstacles corresponding to each of the one or more moving objects, wherein each of the one or more velocity obstacles denote a set of unsafe 3D flight directions for the vehicle, and each of the one or more velocity obstacles is constructed checking each point on a sphere, wherein the checking determines whether each point is marked as unsafe, and wherein the set of unsafe 3D flight directions is indexed by coordinates on $S^2$;
(f) creates a mask in the 3D coordinate system, wherein the mask identifies candidate 3D radial paths that will result in a collision between the vehicle and the one or more moving objects based on each of the one or more velocity obstacles;

(g) combines the mask with the egospace representation in the 3D coordinate system, resulting in a combined representation that further restricts a set of actions of the vehicle; and (h) perform motion planning using the combined representation, wherein the motion planning determines a path including a valid 3D velocity vector for the vehicle, wherein the combined representation avoids the identified candidate 3D radial paths that will result in the collision based on each of the one or more velocity obstacles, and wherein the motion planning provides a solution for a 3D engagement at the speed (V) of the vehicle.

13. The control system of claim 12, further comprising one or more range sensors that are used to acquire the range data.

14. The control system of claim 12, further comprising broadcast receivers that receive a broadcast of the positions and velocities.

15. The control system of claim 12, wherein the navigation system creates the mask by:

encoding candidate 3D velocity vectors into each of the one or more pixels;

recording a collision value in the mask for each candidate 3D velocity vector that lies in any of the velocity obstacles.

16. The control system of claim 15, wherein the navigation system records the collision value by:

calculating and recording a depth, as the collision value, wherein the depth corresponds to a location, within the coordinate system, of the collision of the vehicle with the one or more moving objects.

17. The control system of claim 15, wherein the collision value comprises:

a Boolean value that encodes a collision potential in a direction.

18. The control system of claim 12, wherein the navigation system combines the mask by:

comparing the egospace representation to the mask; and based on the comparing, using a closest collision as the a collision in the combined representation.

19. The control system of claim 12, wherein the navigation system uses the combined representation to determine the path by:

selecting a destination for the vehicle;

transforming the destination into coordinates of the combined representation;

generating a trackable path from the vehicle to the transformed destination through the combined representation that avoids collision with the one or more static objects and the one or more moving objects.

20. The control system of claim 19, wherein:

the navigation system selects a collision free 3D velocity vector from the combined representation;

the trackable path has a turn maneuver;

a final velocity at an end of the turn maneuver is directed radially outward from a position of the vehicle, and equal to the collision free 3D velocity vector; and a duration of the turn maneuver is equal to a second duration of following the collision free 3D velocity vector to a point of intersection with the turn maneuver.

21. The control system of claim 12, wherein the navigation system uses the combined representation to determine the path by:

designating a target obstacle to be pursued by the vehicle;

creating a target mask in the coordinate system, wherein the target mask identifies a target region that will result in an interaction between the vehicle and the target obstacle; and generating a trackable path from the vehicle to the target region through the combined representation while avoiding a collision with the one or more static objects and the one or more moving objects.

22. The control system of claim 12, wherein the control system utilizes one or more actuator inputs to control the one or more vehicle controller actuators to maneuver the vehicle to follow the path.

* * * * *